US012234127B2

(12) United States Patent
Luther et al.

(10) Patent No.: US 12,234,127 B2
(45) Date of Patent: Feb. 25, 2025

(54) ELEVATOR SYSTEM

(71) Applicant: Inventio AG, Hergiswil (CH)

(72) Inventors: Claus-Dietmar Luther, Frankfurt-Bergen-Enkheim (DE); Stefan Weber, Niederwil (CH)

(73) Assignee: INVENTIO AG, Hergiswil (CH)

( * ) Notice: Subject to any disclaimer, the term of this patent is extended or adjusted under 35 U.S.C. 154(b) by 470 days.

(21) Appl. No.: 16/623,642

(22) PCT Filed: Jun. 1, 2018

(86) PCT No.: PCT/EP2018/064397

§ 371 (c)(1),
(2) Date: Dec. 17, 2019

(87) PCT Pub. No.: WO2019/001889

PCT Pub. Date: Jan. 3, 2019

(65) Prior Publication Data

US 2020/0216290 A1 Jul. 9, 2020

(30) Foreign Application Priority Data

Jun. 26, 2017 (EP) .................................... 17177958

(51) Int. Cl.

*B66B 9/16* (2006.01)
*B66B 11/00* (2006.01)
*B66B 19/00* (2006.01)

(52) U.S. Cl.

CPC ............ *B66B 9/16* (2013.01); *B66B 11/0005* (2013.01); *B66B 19/00* (2013.01)

(58) Field of Classification Search

CPC ....... B66B 9/16; B66B 11/0005; B66B 9/187; B66B 19/00; B66B 9/003; B66B 17/14; E04G 1/367; E04F 17/005

See application file for complete search history.

(56) References Cited

U.S. PATENT DOCUMENTS 3,759,349 A * 9/1973 Sieffert .................. B66B 9/187 187/343
3,851,736 A 12/1974 Westlake et al.
4,231,148 A * 11/1980 Harding ................ E04F 17/005 29/469
5,230,404 A 7/1993 Klein
5,479,754 A * 1/1996 Pelvilain ............... B66B 13/303 187/408

(Continued)

FOREIGN PATENT DOCUMENTS

CN 200964317 Y 10/2007
CN 103964282 A 8/2014

(Continued)

*Primary Examiner* — Michael R Mansen
*Assistant Examiner* — Michelle M Mudwilder
(74) *Attorney, Agent, or Firm* — William J. Clemens; Shumaker, Loop & Kendrick, LLP

(57) ABSTRACT

A construction site elevator system temporarily bridges at least part of the distance between the top stop of a jump lift and the top work level on the construction site. The construction site elevator system includes a frame structure and an elevator within the frame structure, the frame structure being configured to be insertable into an elevator shaft and being mountable at different positions in the elevator shaft.

15 Claims, 2 Drawing Sheets

(56) References Cited

U.S. PATENT DOCUMENTS

| | | | | | |
|---|---|---|---|---|---|
| 5,992,565 | A * | 11/1999 | Lingen | B66B 9/16 182/141 |
| 6,079,520 | A * | 6/2000 | Black | B66B 19/00 187/241 |
| 10,023,435 | B2 * | 7/2018 | Taylor | B66B 11/0005 |
| 2005/0150728 | A1 * | 7/2005 | Van Der Meijden | B66B 19/002 187/411 |
| 2007/0181381 | A1 * | 8/2007 | Jungbauer | B66B 9/187 187/401 |
| 2008/0230321 | A1 * | 9/2008 | Csaszar | B66B 9/16 187/244 |
| 2010/0018809 | A1 * | 1/2010 | Peacock | B66B 19/00 187/351 |
| 2013/0284543 | A1 * | 10/2013 | De Jong | B66B 11/00 187/254 |
| 2014/0000987 | A1 | 1/2014 | Peacock et al. | |
| 2015/0307322 | A1 * | 10/2015 | Peacock | B66B 7/064 187/254 |
| 2018/0354753 | A1 * | 12/2018 | Hägg | E04G 21/32 |

FOREIGN PATENT DOCUMENTS

| | | | |
|---|---|---|---|
| EP | 0501140 | A1 | 9/1992 |
| EP | 0846645 | B1 | 8/2004 |
| EP | 2636629 | A1 | 9/2013 |
| FR | 3035094 | A1 | 10/2016 |
| JP | H0977423 | A | 3/1997 |
| JP | H09165160 | A * | 6/1997 |
| JP | 2002037568 | A | 2/2002 |
| JP | 2012206857 | A | 10/2012 |

* cited by examiner

ELEVATOR SYSTEM

FIELD

The invention relates to a construction site elevator system for temporarily bridging at least part of the distance between the top stop of a jump lift and the top work level on the construction site.

BACKGROUND

On construction sites of high-rise buildings, what are known as jump lifts, which grow with the building, are generally used to transport people and materials within the building. Such a jump lift has a plurality of platforms, in particular a machine platform, a lifting platform and a crash deck, which are gradually raised within the elevator shaft of the jump lift and require a relatively large space. As a result, the top stop of the jump lift is usually arranged 30 to 40 m below the highest work level of the construction site, i.e. in particular the upper end of a casting mold for casting the elevator shafts.

This can be problematic because in some countries there are work regulations that allow workers to reach only a certain elevation by foot.

SUMMARY

An object of the invention is to provide a construction site elevator system for temporarily bridging at least part of this distance between the top stop of a jump lift and the top work level of the construction site, which system is simple in design, quick to install and the position of which within the building can be changed.

According to the invention, the construction site elevator system comprises a frame structure and an elevator within the frame structure. In this case, the frame structure is designed in such a way as to be insertable into an elevator shaft and mountable at different positions, in particular arbitrary positions, on the elevator shaft.

By arranging the elevator in a frame structure, the entire construction site elevator system can be easily introduced into the shaft. In particular, the individual components of the elevator do not need to be assembled on the construction site. In addition, the frame structure allows the gradual raising of the elevator at any time by the frame structure being simply raised and mounted at different positions on the elevator shaft.

The insertion of the construction site elevator system into the elevator shaft is carried out in particular by means of a crane or helicopter. Lifting can also be carried out by means of a crane. Alternatively, however, the lifting can also be carried out by any other lifting apparatus, for example by pushing from below.

The construction site elevator system is in particular also raised each time the jump lift is raised, so that at least part of the distance between the top stop of the jump lift and the top work level of the construction site is bridged by the construction site elevator system.

The construction site elevator system is preferably designed such that it can bridge between two and ten, in particular between three and five, floors of the construction site.

The elevator of the construction site elevator system within the frame structure is in particular a complete elevator, which comprises all the components of the elevator, so that no further installation of parts of the elevator on the construction site is necessary. In particular, the elevator incorporated in the frame structure is a "standard lift" which is also permanently installed in buildings.

In particular, the elevator has a car, a counterweight, a motor for moving the car and the counterweight, and/or at least one suspension means for suspending the car and/or the counterweight. The car and the counterweight are in this case guided in particular on rails which are fixed to the frame structure, and can be moved within the frame structure. Alternatively, the elevator may also be a hydraulic elevator.

The frame structure is in particular designed as scaffolding, in particular steel scaffolding. Such steel scaffolding offers high strength and loading capacity with a lightweight design. In particular, the frame structure is composed of tubes. In an alternative embodiment, the frame structure may also consist of closed walls.

The frame structure has in particular at least two cavities which function as door openings for entering and/or leaving the car of the elevator. The first of the two cavities is arranged at the lower end of the frame structure, and the second at the upper end of the frame structure, such that a maximum possible distance can be bridged.

In a preferred embodiment of the invention, at least three cavities are provided for entering and/or leaving the car of the elevator. Passengers can be evacuated via this additional third cavity in an emergency.

In at least two of these cavities, in particular doors are provided for closing the cavities. This has the advantage that doors which would have to be dismantled when the construction site elevator system is raised and refitted on another floor do not have to be provided at each of the corresponding shaft openings. Instead, the function of the shaft door can be fulfilled by the doors of the construction site elevator system.

In particular, doors are provided on the frame structure only at the top and bottom stops of the construction site elevator system, whereas at the other stops the cavities are not closed by doors. In this case, on the other floors of the shaft, the opening is temporarily closed in each case by simple means, such as wooden partitions. A cost-effective design is thus achieved, as doors are provided only at the necessary locations.

In a preferred embodiment the vertical position of at least one of the doors, in particular the lowermost door, can be adjusted relative to the frame structure in a predetermined range. This ensures that the construction site elevator system can be adapted to different floor heights.

The construction site elevator system is operated in particular such that it can only carry out journeys between the bottom and the top stops of the construction site elevator system.

Furthermore, it is advantageous if mounting means are provided for mounting the frame structure on the elevator shaft. The frame structure and thus the construction site elevator system can be mounted in particular by being placed on one or more beams. Alternatively or additionally, they can also be screwed to the shaft wall. Furthermore, it is alternatively possible for the frame structure to be suspended from above on a holding device.

The mounting means are preferably designed such that they engage in the door openings of the shaft wall for mounting. Extra cavities in which the mounting means would engage therefore do not need to be provided in the shaft wall.

In a preferred embodiment, at least one pivotable beam is provided on the frame structure, which beam is pivoted after the construction site elevator system has been positioned at the desired location of the shaft, as a result of which the construction site elevator system is aligned relative to the elevator shaft and/or the construction site elevator system is mounted in the elevator shaft by the beam engaging in openings of the elevator shaft provided for this purpose. The beam is arranged in particular at the upper end of the frame structure, preferably in the region of the top door.

Further, it is advantageous if a plurality of rotatably mounted rollers and/or wheels are provided on the frame structure on the side facing away from the elevator, i.e. on the outside. This ensures that, when inserted into the shaft, the construction site elevator system can slide on the rollers or wheels along the shaft wall without damaging the shaft wall or being damaged itself.

The invention also relates to an elevator system comprising a first and at least one second elevator shaft, a jump lift being arranged in the first elevator shaft and a construction site elevator system, as described above, being arranged in the second elevator shaft. The construction site elevator system is in this case arranged in the second elevator shaft, such that the bottom stop of the construction site elevator system corresponds to the top stop of the jump lift. This ensures that passengers who have travelled to the top stop in the jump lift can easily transfer to the construction site elevator system and thus continue to travel upward within the building.

Each time the jump lift is raised, the construction site elevator system is preferably also raised accordingly.

Additional features and advantages of the invention are provided in the following description, which describes the invention in greater detail on the basis of embodiments in conjunction with the attached drawings.

DETAILED DESCRIPTION

Figure 1:
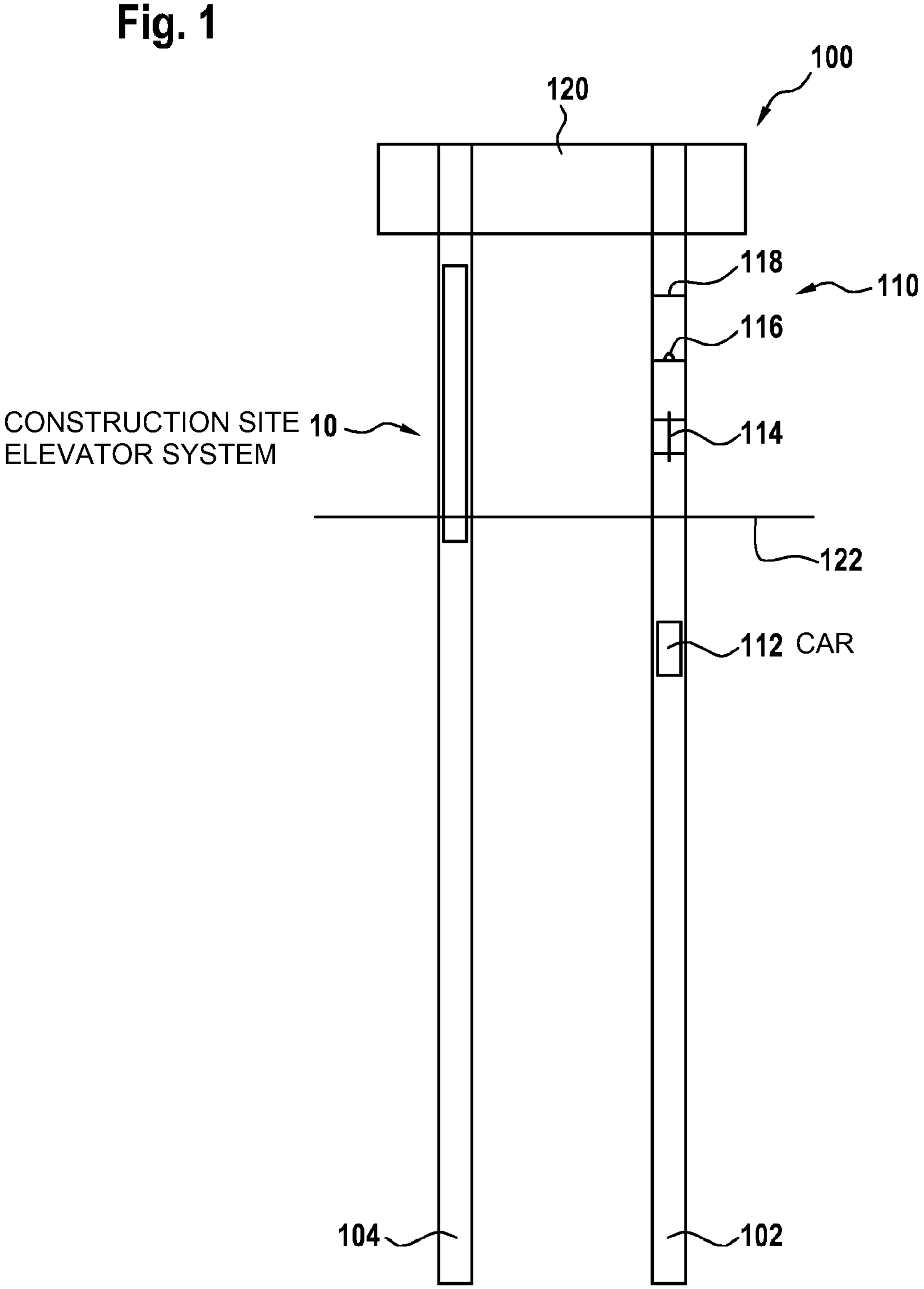
FIG. 1 is a schematic, highly simplified illustration of an elevator system.

FIG. 1 is a schematic, highly simplified illustration of an elevator system 100, the elevator system 100 having two elevator shafts 102, 104. A jump lift 110 is provided in the first elevator shaft 102.

The jump lift 110 comprises a car 112 which is movable within the first elevator shaft 102, a machine platform 114 on which the machine for moving the car 112 is arranged, a lifting platform 116 and a crash deck 118.

The machine platform 114, the lifting platform 116 and the crash deck 118 can be gradually raised within the elevator shaft 102 so that the jump lift 110 can grow together with the building.

At the upper end of the two elevator shafts 102, 104, a casting mold 120 is arranged, by means of which further floors of the elevator shafts 102, 104 are cast gradually.

The top stop of the jump lift 110 is indicated by the line 122. As can be seen in FIG. 1, there is a large distance between this top stop level 122 and the casting mold 120, which distance can often be up to 40 m. In order to bridge this distance, a construction site elevator system 10 (shown in more detail in FIG. 2) is arranged in the second elevator shaft 104, which system can be raised correspondingly to the jump lift 110 and mounted at correspondingly different positions on the second elevator shaft 104.

Figure 2:
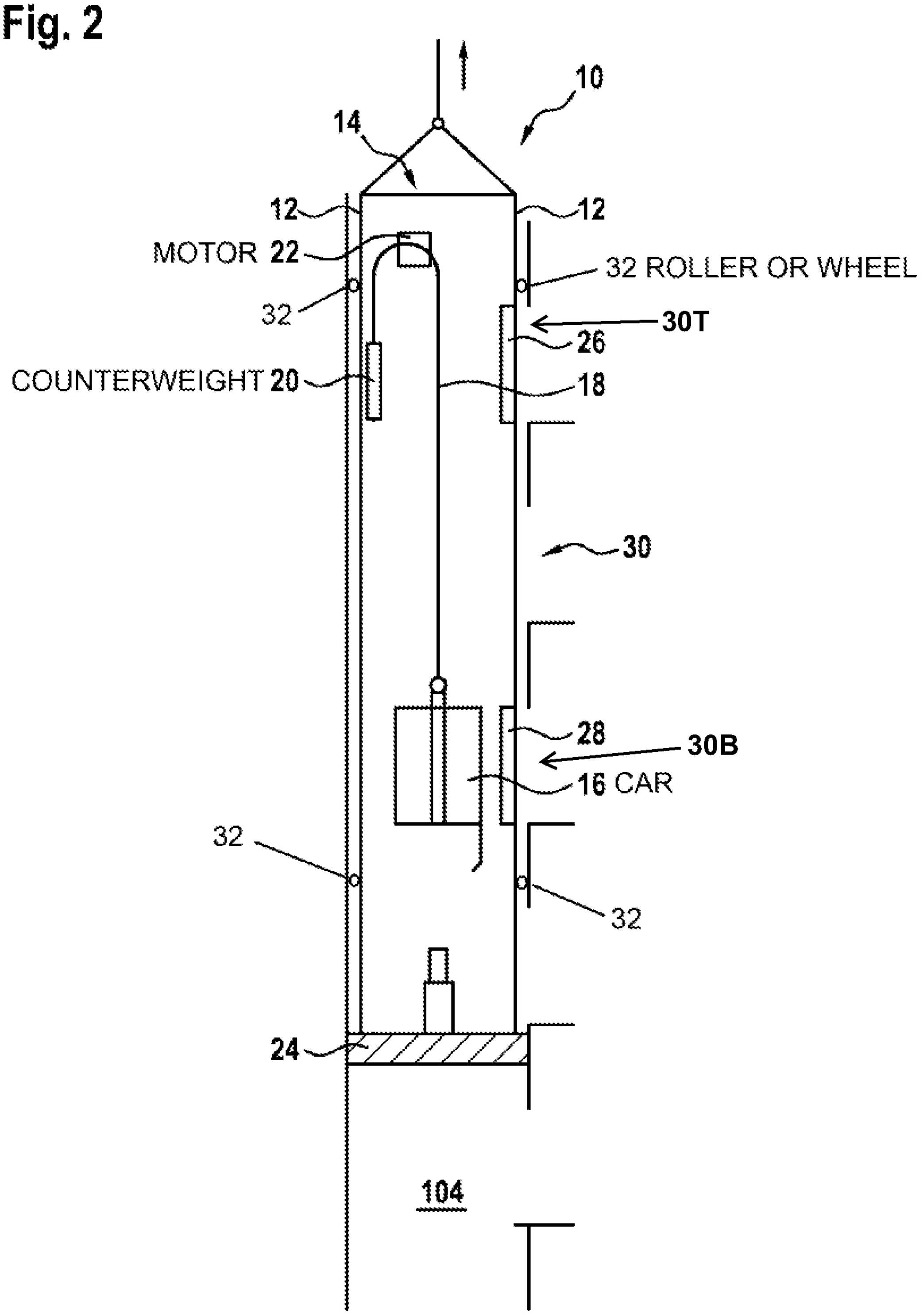
FIG. 2 is a schematic illustration of a section of the elevator system according to FIG. 1.

As shown in FIG. 2, the construction site elevator system 10 has a frame structure 12 within which a complete elevator 14 is arranged. This elevator 14 has a car 16, a counterweight 20 connected to the car 16 via a suspension means 18 and a motor 22 for moving the car 16. The elevator 14 is already completely arranged in the frame structure 12 in advance, so that no assembly is necessary on the construction site. On the contrary, the complete construction site elevator system 10 is simply inserted, in particular by means of a crane, into the elevator shaft 104 and mounted by suitable mounting means at the desired position on the elevator shaft 104. In the example shown in FIG. 2, mounting is carried out by the construction site elevator system 10 being placed on a beam 24.

A total of three lateral cavities 30, 30B, 30T are provided in the frame structure 12, which cavities coincide with corresponding door openings of three floors arranged one above the other. Furthermore, the frame structure has a door 26, 28 at the top and bottom stops 30T, 30B, respectively, of the construction site elevator system 10, by means of which doors these cavities are closed. This has the advantage that no doors need to be installed at the openings of the elevator shaft 104.

In the example shown in FIG. 2, no door is provided in the case of the central cavity 30 of the frame structure, i.e. the cavity 30 which coincides with the central floor. Instead, the opening in the shaft wall is closed by means of boards. In an alternative embodiment of the invention, a door may be provided on the frame structure 12 here, too.

When the jump lift 110 has been raised, the construction site elevator system 10 is also raised correspondingly, for example via the crane by means of which it was inserted, and fixed at a new location of the elevator shaft 104. Alternatively, lifting can also take place from below, for example, by pushing by means of a hydraulic arrangement. It is advantageous if a plurality of rotatably mounted rollers and/or wheels 32 are provided on the frame structure 12 on the side facing away from the car 16, i.e. on the outside. This ensures that, when inserted into the shaft 104, the construction site elevator system 10 can slide on the rollers or wheels 32 along the shaft walls without damaging the shaft walls or being damaged itself.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

10 Construction site elevator system
12 Frame structure
14 Elevator
16 Car
18 Suspension means
20 Counterweight
22 Motor
24 Beam
26, 28 Door
30 Cavity
32 Roller or wheels
100 Elevator system
102, 104 Elevator shaft
110 Jump lift
112 Car
114 Machine platform

116 Lifting platform
118 Crash deck
120 Casting mold
122 Level

The invention claimed is:

1. An elevator system for a construction site, the elevator system comprising:

a first elevator shaft and a second elevator shaft;

a jump lift arranged in the first elevator shaft and movable up to a top stop below a top work level of the construction site;

a construction site elevator system arranged in the second elevator shaft for temporarily bridging at least part of a distance between the top stop of the jump lift and the top work level;

wherein the construction site elevator system includes a frame structure and an elevator incorporated in the frame structure, the elevator having an elevator car vertically movable within the frame structure, the frame structure including a plurality of rotatably mounted rollers and/or wheels positioned to contact and slide along at least one wall of the second elevator shaft as the construction site elevator system is lowered and raised; and wherein the construction site elevator system is insertable into the second elevator shaft and is selectively mountable at different positions on the second elevator shaft including at the top stop.

2. The elevator system according to claim 1 wherein the frame structure is formed as scaffolding.

3. The elevator system according to claim 2 wherein the scaffolding is steel scaffolding.

4. The elevator system according to claim 1 wherein the frame structure includes at least two cavities formed therein for entering and/or leaving the elevator car.

5. The elevator system according to claim 4 including doors for closing the cavities are provided at the at least two cavities in the frame structure.

6. The elevator system according to claim 5 wherein the at least two cavities are a top cavity and a bottom cavity.

7. The elevator system according to claim 1 wherein the frame structure includes at least three cavities for entering and/or leaving the elevator car.

8. The elevator system according to claim 7 including doors for closing the cavities are provided at at least two of the at least three cavities in the frame structure.

9. The elevator system according to claim 7 including doors for closing the cavities are provided only at a top cavity and a bottom cavity of the at least three cavities.

10. The elevator system according to claim 1 wherein the elevator includes the elevator car, a counterweight, a motor for moving the car and the counterweight, and a suspension means suspending the car and the counterweight.

11. The elevator system according to claim 1 including mounting means mounting the frame structure on the second elevator shaft.

12. The elevator system according to claim 11 wherein the mounting means is adapted to engage in door openings of a shaft wall of the second elevator shaft for mounting the frame structure.

13. The elevator system according to claim 1 wherein a bottom stop of the construction site elevator system is at a level of the top stop of the jump lift.

14. A method for temporarily bridging at least part of a distance between a top stop of a jump lift in a first elevator shaft and a top work level of an elevator system construction site, the method comprising the steps of:

providing a construction site elevator system including a frame structure and an elevator within the frame structure, wherein the elevator has an elevator car vertically movable within the frame structure and the frame structure is configured to be insertable into a second elevator shaft and mountable at different positions on the second elevator shaft, the frame structure including a plurality of rotatably mounted rollers and/or wheels positioned to contact at least one wall of the second elevator shaft;

temporarily mounting the construction site elevator system at a first position in the second elevator shaft of the construction site with a mounting means to temporarily bridge at least part of the distance between the top stop of the jump lift and the top work level of the construction site wherein the first position can be the top stop;

removing the mounting means from the first position;

lifting the construction site elevator system to a second position in the second elevator shaft with the rollers and/or wheels sliding along the at least one wall of the second elevator shaft; and mounting the construction site elevator system at the second position in the second elevator shaft with the mounting means.

15. The method according to claim 14 including performing the lifting by raising the construction site elevator system gradually in the second elevator shaft.

* * * * *